(12) United States Patent
Craton et al.

(10) Patent No.: US 9,469,793 B2
(45) Date of Patent: Oct. 18, 2016

(54) PRESSURE SENSITIVE ADHESIVES CONTAINING POLYMERIC SURFACE-MODIFIED NANOPARTICLES

(75) Inventors: Michele A. Craton, Cottage Grove, MN (US); Kelly S. Anderson, Houlton, WI (US); Belma Erdogan-Haug, St. Paul, MN (US); Jayshree Seth, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 593 days.

(21) Appl. No.: 13/634,366

(22) PCT Filed: Apr. 19, 2011

(86) PCT No.: PCT/US2011/033003
§ 371 (c)(1),
(2), (4) Date: Sep. 12, 2012

(87) PCT Pub. No.: WO2011/133518
PCT Pub. Date: Oct. 27, 2011

(65) Prior Publication Data
US 2013/0040069 A1 Feb. 14, 2013

(51) Int. Cl.
*C09J 133/08* (2006.01)
*C09J 133/10* (2006.01)

(52) U.S. Cl.
CPC .............. *C09J 133/08* (2013.01); *C09J 133/10* (2013.01)

(58) Field of Classification Search
CPC ........ C09J 133/08; C09J 133/10; C08K 9/06
USPC .......................................................... 427/433
See application file for complete search history.

(56) References Cited

U.S. PATENT DOCUMENTS

| | | |
|---|---|---|
| 2,801,185 A | 6/1957 | Iler |
| 3,018,262 A | 1/1962 | Schroeder |
| 3,298,998 A | 1/1967 | Coover et al. |
| 3,562,223 A | 2/1971 | Bargain et al. |
| 3,627,780 A | 12/1971 | Bonnard et al. |
| 3,839,358 A | 10/1974 | Bargain |

(Continued)

FOREIGN PATENT DOCUMENTS

| | | |
|---|---|---|
| DE | 10 259460 | 7/2004 |
| EP | 2 314 651 | 4/2011 |

(Continued)

OTHER PUBLICATIONS

PCT International Search Report for PCT/US2011/0033003, mailed Jul. 14, 2011, 3 pages.

(Continued)

*Primary Examiner* — Robert S Walters, Jr.
(74) *Attorney, Agent, or Firm* — Dena M. Ehrich; Philip Y. Dahl

(57) ABSTRACT

Pressure sensitive adhesives comprising an acrylate polymer and surface-modified nanoparticles are described. The surface-modified nanoparticles comprise a nanoparticle having a silica surface and surface modifying groups covalently attached to the silica surface. At least one surface-modifying group is a polymeric silane surface modifying group. At least one surface-modifying group is a non-polymeric silane surface modifying group. Methods of preparing such adhesives, including their exposure to UVA and UVC radiation are also described.

17 Claims, 2 Drawing Sheets

(56) References Cited

U.S. PATENT DOCUMENTS

| | | |
|---|---|---|
| 4,046,734 A | 9/1977 | Zimmerli |
| 4,100,140 A | 7/1978 | Zahir et al. |
| 4,157,360 A | 6/1979 | Prevorsek et al. |
| 4,181,752 A | 1/1980 | Martens et al. |
| 4,330,590 A | 5/1982 | Vesley |
| 4,379,201 A | 4/1983 | Heilmann et al. |
| 4,468,497 A | 8/1984 | Street et al. |
| 4,522,958 A | 6/1985 | Das et al. |
| 5,843,525 A | 12/1998 | Shibasaki et al. |
| 6,586,483 B2 | 7/2003 | Kolb et al. |
| 7,393,901 B1 | 7/2008 | Filiatrault et al. |
| 7,514,263 B2 | 4/2009 | Nelson et al. |
| 7,531,595 B2 | 5/2009 | Lewandowski et al. |
| 7,767,736 B2 | 8/2010 | Baran, Jr. |
| 7,981,949 B2 | 7/2011 | Anderson et al. |
| 2003/0220204 A1 | 11/2003 | Baran et al. |
| 2006/0041035 A1 | 2/2006 | Poppe et al. |
| 2006/0134362 A1 | 6/2006 | Lu et al. |
| 2007/0213449 A1 | 9/2007 | Lewandowski et al. |
| 2008/0153963 A1 | 6/2008 | Baran et al. |
| 2011/0077334 A1 | 3/2011 | Oi et al. |
| 2011/0097212 A1 | 4/2011 | Thompson et al. |
| 2012/0313056 A1* | 12/2012 | Baran .................. H01B 1/22 252/519.21 |

FOREIGN PATENT DOCUMENTS

| | | |
|---|---|---|
| GB | 904177 | 8/1962 |
| JP | H05-269365 | 10/1993 |
| JP | H10-25430 | 1/1998 |
| WO | WO 02/062881 | 8/2002 |
| WO | WO 02/066571 | 8/2002 |
| WO | WO 03/044099 | 5/2003 |
| WO | WO 2006/065373 | 6/2006 |
| WO | WO 2006/083688 | 8/2006 |
| WO | WO 2009/011278 | 1/2009 |
| WO | WO 2009/120868 | 10/2009 |
| WO | WO 2009/131920 | 10/2009 |
| WO | WO 2009/138471 | 11/2009 |
| WO | WO 2010/080459 | 7/2010 |
| WO | WO 2011/063217 | 5/2011 |

OTHER PUBLICATIONS

Handbook of Thermoset Plastics (Second Edition), William Andrew Publishing, p. 122 (1998).
U.S. Appl. No. 61/181,052, James M. Nelson et al., filed May 26, 2009.
Epoxy Resins, Chemistry and Technology, Second Edition, edited by C. May, Marcel Dekker, Inc., New York, 1988.
Handbook of Epoxy Resins by Lee and Neville, McGraw-Hill Book Co., New York, 1967.
ASTM E122-09e1, "Standard Practice for Calculating Sample Size to Estimate, With Specified Precision, the Average for a Characteristic of a Lot of Process", 2009, 5 pages.
U.S. Appl. No. 61/303,406, Kristin L. Thunhorst et al., filed Feb. 11, 2010.
Liu G. et al., "Influence of nano-$SiO_2$ on properties of polyacrylate emulsion pressure sensitive adhesives", vol. 34, No. 7, 2006, pp. 73-76.

* cited by examiner

PRESSURE SENSITIVE ADHESIVES CONTAINING POLYMERIC SURFACE-MODIFIED NANOPARTICLES

CROSS REFERENCE TO RELATED APPLICATIONS

This application is a national stage filing under 35 U.S.C. 371 of PCT/US2011/033003, filed Apr. 19, 2011, which claims priority to U.S. Provisional Application No. 61/325,963, filed Apr. 20, 2010, the disclosure of which is incorporated by reference in its/their entirety herein.

FIELD

The present disclosure relates to pressure sensitive adhesives containing nanoparticles surface modified with polymeric silane surface-modifying agents.

SUMMARY

Briefly, in one aspect, the present disclosure provides a pressure sensitive adhesive comprising an acrylate polymer and surface-modified nanoparticles. The surface-modified nanoparticles comprise a nanoparticle comprising a silica surface; a polymeric silane surface modifying group; and a non-polymeric silane surface modifying group. Both the polymeric silane surface modifying group and the non-polymeric silane surface modifying group are covalently bonded to the silica surface of the nanoparticle.

In some embodiments, the acrylate polymer comprises the reaction product of one or more (meth)acrylate monomers and at least one vinyl carboxylic acid monomer. In some embodiments, the polymeric silane surface modifying group comprises (meth)acrylate repeat units. In some embodiments, the polymeric silane surface modifying group comprises vinyl carboxylic acid repeat units.

In some embodiments, the non-polymeric silane surface modifying agent comprises at least one of a trialkoxy alkyl silane and a trialkoxy aryl silane. In some embodiments, the mole percent ratio of the non-polymeric surface modifying agent to the polymeric surface modifying agent is between 95:5 and 50:50, inclusive, e.g., between 80:20 and 60:40, inclusive.

In some embodiments, polymeric surface modifying agent comprises a functional group capable of crosslinking with the acrylate polymer. In some embodiments the pressure sensitive adhesive further comprises a crosslinker and/or a tackifier.

In another aspect, the present disclosure provides a method of preparing a pressure sensitive adhesive comprising exposing a mixture of a first (meth)acrylate monomer, a vinyl carboxylic acid, a first photoinitiator, and surface-modified nanoparticles to UVA radiation sufficient to partially polymerize the first (meth)acrylate monomer and the vinyl carboxylic acid forming a partially-polymerized mixture; adding a crosslinker and a second photoinitiator to the partially-polymerized mixture to form a coating; applying the coating to a substrate; and exposing the coating to UVA irradiation to form the pressure sensitive adhesive. In some embodiments, the method further comprises exposing the pressure sensitive adhesive to UVC irradiation to crosslink the polymeric surface modifying agent with the acrylate polymer.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Figure 1:
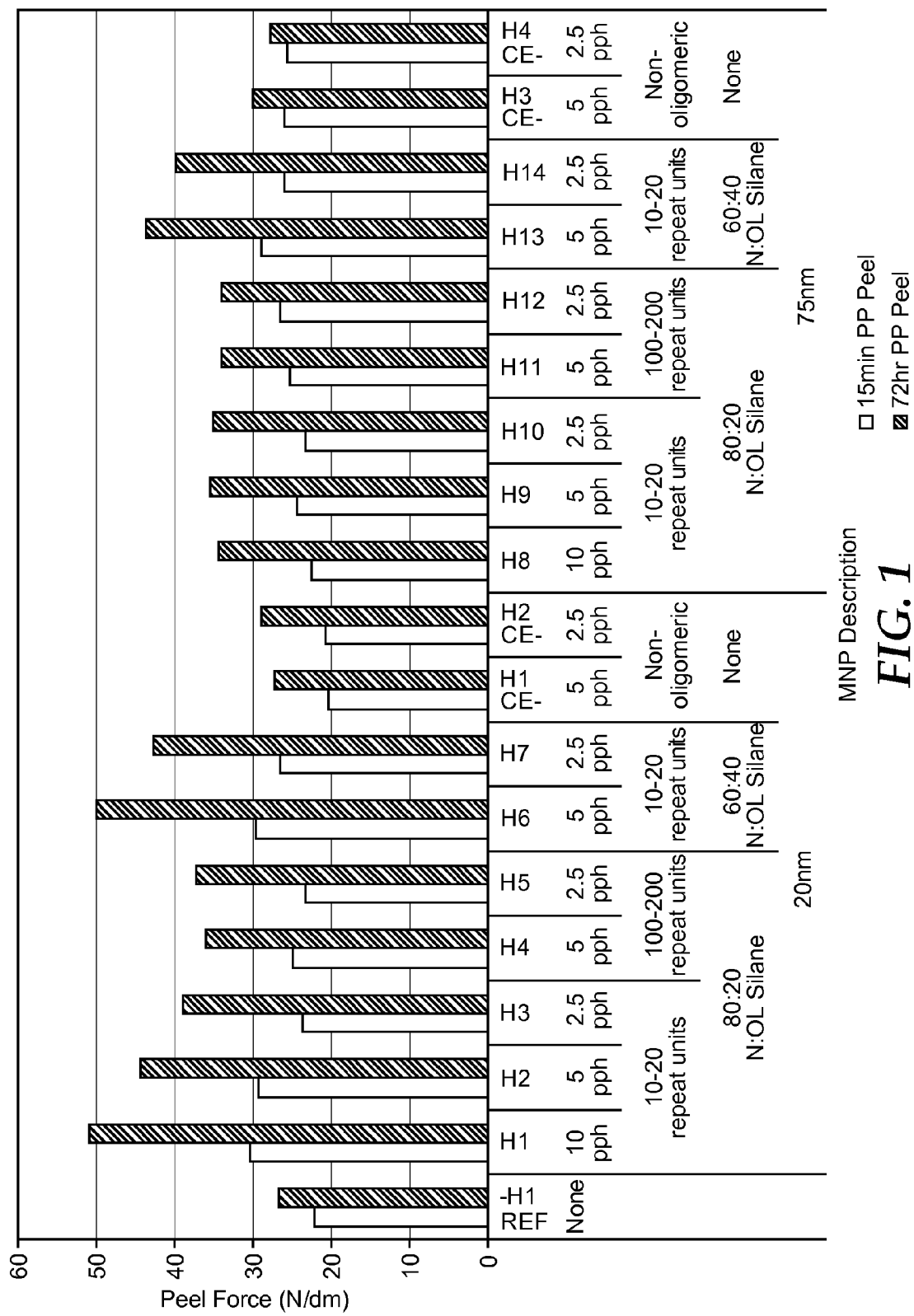
FIG. 1 is bar chart showing the peel performance of the adhesives of Data Set H against stainless steel, a high surface energy substrate.

Generally, adhesives, e.g., pressure sensitive adhesives (PSA), including acrylic adhesives are well-known. The use of additives such as tackifiers, plasticizers, and fillers to modify the performance of adhesives is also known. However, although individual components of an adhesive formula may be known, the selection of a specific combination of components and their relative amounts in order to achieve specific, desired end-use requirements remains a significant challenge.

The use of surface-modified nanoparticles in resins, including curable resins is also known. It has even been suggested that surface-modified nanoparticles could be incorporated into a PSA. However, like any other potential additive, selecting the specific nanoparticles, surface-modifying agents, and amounts, as well as formulating such surface-modified nanoparticles into a particular adhesive composition remains a significant challenge.

One problem confronting adhesive developers is the desire to provide a robust pressure sensitive adhesive suitable for use on a wide variety of substrates, including both high surface energy and low surface energy substrates. Generally, low surface energy substrates are defined as those having a surface energy of less than 37 dynes/cm such as polypropylene and polyethylene (e.g., high density polyethylene). Generally, high surface energy substrates are defined as those having a surface energy of greater than 37 dyne/cm, e.g., greater than about 200 dyne/cm including, e.g., aluminum, glass, and stainless steel.

In addition to improving the peel adhesion to a wide range of substrates, adhesive formulators must also consider the effects on other adhesive properties such as cohesive strength. Cohesive strength is often evaluated by determining the shear strength of the adhesive. For example, the addition of tackifiers may improve adhesion (e.g., peel strength) but often decreases cohesive strength (e.g., shear strength).

Generally, the present disclosure provides pressure sensitive adhesives comprising silica nanoparticles, surface modified with polymeric, reactive or non-reactive silane functional groups. The surface-modified nanoparticles are dispersed in an acrylic adhesive.

Generally, the acrylic adhesive comprises an acrylic copolymer comprising the reaction product of a mixture of a first alkyl(meth)acrylate and a vinyl carboxylic acid. As used herein, "(meth)acrylate" refers to an acrylate and/or methacrylate. For example, butyl(meth)acrylate refers to butyl acrylate and/or butyl methacrylate. In some embodiments, the mixture may also include a crosslinking agent.

The alkyl group of the first alkyl(meth)acrylate contains 4 to 18 carbon atoms. In some embodiments, this alkyl group contains at least 5 carbon atoms. In some embodiments, this alkyl group contains no greater than 8 carbon atoms. In some embodiments, the alkyl group of the first alkyl(meth)acrylate has eight carbon atoms, e.g., isooctyl(meth)acrylate and/or 2-ethylhexyl(meth)acrylate.

Exemplary vinyl carboxylic acids that may be useful in some embodiments of the present disclosure include acrylic acid, methacrylic acid, itaconic acid, maleic acid, fumaric acid, and β-carboxyethylacrylate.

In some embodiments, the acrylic copolymers of the present disclosure comprise at least 2% by weight, in some embodiments, at least 3% by weight of the vinyl carboxylic acid based on the total weight of the alkyl(meth)acrylates and the vinyl carboxylic acids. In some embodiments, the acrylic polymer comprises no greater than 10% by weight, in some embodiments, no greater than 8% by weight, and, in some embodiments, no greater than 5% by weight of the vinyl carboxylic acid. In some embodiments, the acrylic polymer comprises 3-5% by weight, inclusive, of vinyl carboxylic acid based on the total weight of the alkyl(meth)acrylates and the vinyl carboxylic acids. Generally, acrylic adhesives containing such higher levels of a vinyl carboxylic acid are thought to be suitable for bonding to high surface energy substrates such as, e.g., stainless steel.

In some embodiments, the acrylic copolymers of the present disclosure comprise less than 2% by weight, e.g., less than 1% by weight, of the vinyl carboxylic acid based on the total weight of the alkyl(meth)acrylates and the vinyl carboxylic acids. In some embodiments, the acrylic copolymer comprises 0.3 to 1.5% by weight, e.g., 0.5 to 1% by weight, inclusive, of vinyl carboxylic acid based on the total weight of the alkyl (meth)acrylates and the vinyl carboxylic acids.

In some embodiments, the mixture may comprise one or more additional monomers including one or more additional alkyl(meth)acrylates. In some embodiments, the alkyl group of at least one of the alkyl(meth)acrylates contains no greater than 4 carbon atoms. In some embodiments, the alkyl group of at least one alkyl(meth)acrylate has 4 carbon atoms, e.g., butyl(meth)acrylate. In some embodiments, the alkyl group of at least one alkyl(meth)acrylate has 1-2 carbon atoms, e.g., methyl acrylate and/or ethyl acrylate.

In some embodiments, a non-polar alkyl(meth)acrylate may be used. As used herein, a non-polar monomer is a monomer whose homopolymer has a solubility parameter as measured by the Fedors' method of not greater than 10.50. The inclusion of a non-polar monomer improves the low energy surface adhesion of the adhesive. It also improves the structural properties of the adhesive (e.g., cohesive strength). Examples of suitable non-polar monomers and their Fedors' solubility parameter ($(\text{cal/cm}^3)^{1/2}$) include 3,3,5 trimethylcyclo-hexyl acrylate (9.35), cyclohexyl acrylate (10.16), isobornyl acrylate (9.71), N-octyl acrylamide (10.33), butyl acrylate (9.77), and combinations thereof.

The photopolymerizable composition may contain a crosslinking agent to enhance the cohesive strength of the resulting adhesive or article. Suitable crosslinking agents include hydrogen-abstracting carbonyls such as anthraquinone and benzophenone and their derivatives as disclosed in U.S. Pat. No. 4,181,752, and polyfunctional acrylates such as 1,6-hexanediol diacrylate, trimethylolpropane triacrylate, and 1,2-ethyleneglycol diacrylate, as well as those disclosed in U.S. Pat. No. 4,379,201. Other useful crosslinkers monomers include polymeric multifunctional (meth)acrylates, e.g., poly(ethylene oxide) diacrylate or poly(ethylene oxide) dimethacrylate; polyvinylic crosslinking agents such as substituted and unsubstituted divinylbenzene; and difunctional urethane acrylates such as "EBECRYL" 270 and "EBECRYL" 230 (1500 weight average molecular weight and 5000 weight average molecular weight acrylated urethanes, respectively—both available from UCB of Smyrna, Ga.), and combinations thereof. Useful crosslinking agents that also function as photoinitiators are the chromophore-substituted halomethyl-s-triazines disclosed in U.S. Pat. Nos. 4,330,590 and 4,329,384.

In some embodiments, the PSAs of the present disclosure may include common additives such as tackifiers and plasticizers. Generally, tackifiers are materials that are compatible with the acrylic copolymer to which they are added and have a glass transition temperature (Tg) greater than the Tg of the acrylic copolymer. In contrast, a plasticizer is compatible with the acrylic copolymer but has a Tg less than the Tg of the acrylic copolymer. Although the actual Tg varies depending on the formulation of the acrylic copolymer, the Tg of acrylic copolymers typically less than −20° C., e.g., less than −30° C., less than −40° C., or even less than −50° C.

In some embodiments, the adhesives of the present disclosure include at least one tackifier. Exemplary high Tg tackifiers include terpenes, aliphatic- or aromatic-modified C5 to C9 hydrocarbons, and rosin esters. Exemplary low Tg tackifiers include terpene phenolic resins, terpenes, aliphatic- or aromatic-modified C5 to C9 hydrocarbons, and rosin esters.

Generally, the adhesives of the present disclosure are curable through the use of actinic radiation, e.g., ultraviolet light (UV). In some embodiments UVA radiation may be used. In some embodiments, UVC radiation may be used alone, or in combination (e.g., sequentially) with UVA radiation. As used herein, UVA radiation refers to actinic radiation having a wavelength of about 320 to 390 nm. As used herein, UVC radiation refers to actinic radiation having a wavelength of about 250 to 260 nm.

Typically, photoinitiators are included in such UV-cured compositions. Photoinitiators useful in the present invention include benzoin ethers, substituted benzoin ethers such as benzoin methyl ether or benzoin isopropyl ether, substituted acetophenones such as 2,2-dimethoxy-1,2-diphenylethan-1-one; 2,2,-diethoxy-acetophenone and 2,2-dimethyl-acetophenone; substituted alpha-ketols such as 2-methyl-2-hydroxy propiophenone; aromatic sulphonyl chlorides such as 2-naphthalene sulphonyl chloride; photoactive oximes such as 1-phenyl-1,2-propanedione-2-(O-ethoxycarbonyl)oxime; substituted triazines; and oligomeric photoinitiators such as oligomeric 2-hydroxy-2-methyl-1-[4-methylvinyl)phenyl]-1-propanone (available as ESACURE KIP 150 from Sartomer, Exton, Pa.), and mixtures thereof. In some embodiments, preferred photoinitiators include 2,2-dimethoxy-1,2-diphenylethan-1-one (available from Ciba Additives as IRGACURE 651 and from Sartomer, Exton, Pa. as ESACURE KB-1), IRGACURE 184 (Ciba), DAROCUR 2959 (Ciba), and DAROCUR 1173 (Ciba).

The acrylic adhesives of the present disclosure contain surface-modified nanoparticles. Generally, "surface modified nanoparticles" comprise surface treatment agents attached to the surface of a nanometer scale core. In some embodiments, the core is substantially spherical. In some embodiments, the cores are relatively uniform in primary particle size. In some embodiments, the cores have a narrow particle size distribution. In some embodiments, the core is substantially fully condensed. In some embodiments, the core is amorphous. In some embodiments, the core is isotropic. In some embodiments, the particles are substantially non-agglomerated. In some embodiments, the particles are substantially non-aggregated in contrast to, for example, fumed or pyrogenic silica.

As used herein, "agglomerated" is descriptive of a weak association of primary particles usually held together by charge or polarity. Agglomerated particles can typically be broken down into smaller entities by, for example, shearing forces encountered during dispersion of the agglomerated particles in a liquid.

In general, "aggregated" and "aggregates" are descriptive of a strong association of primary particles often bound together by, for example, residual chemical treatment, covalent chemical bonds, or ionic chemical bonds. Further breakdown of the aggregates into smaller entities is very difficult to achieve. Typically, aggregated particles are not broken down into smaller entities by, for example, shearing forces encountered during dispersion of the aggregated particles in a liquid.

As used herein, the term "silica nanoparticle" refers to a nanoparticle having a nanometer scale core with a silica surface. This includes nanoparticle cores that are substantially entirely silica, as well nanoparticle cores comprising other inorganic (e.g., metal oxide) or organic cores having a silica surface. In some embodiments, the core comprises a metal oxide. Any known metal oxide may be used. Exemplary metal oxides include silica, titania, alumina, zirconia, vanadia, chromia, antimony oxide, tin oxide, zinc oxide, ceria, and mixtures thereof. In some embodiments, the core comprises a non-metal oxide.

Generally, the nano-sized silica particles have an average core diameter of less than 200 nm, e.g., less than 100 nm. In some embodiments, the nano-sized silica particles have an average core diameter of at least 5 nm, e.g., at least 10 nm. In some embodiments, the nano-sized silica particles have an average core diameter of between 50 and 100 nm, inclusive. In some embodiments, the nano-sized silica particles have an average core diameter of between 10 and 30 nm, inclusive.

Although other methods such as titration and light scattering techniques may be used, the particle size referred to herein is based on transmission electron microscopy (TEM). Using this technique, TEM images of the nanoparticles are collected, and image analysis is used to determine the particle size of each particle. A count-based particle size distribution is then determined by counting the number of particles having a particle size falling within each of a number of predetermined discrete particle size ranges. The number average particle size is then calculated. One such method is described in U.S. Provisional Application 61/303,406 ("Multimodal Nanoparticle Dispersions, Thunhorst et al.) filed 11 Feb. 2010, and will be referred to herein as the "Transmission Electron Microscopy Procedure".

Transmission Electron Microscopy Procedure. To measure the particle size and particle size distribution, a nanoparticle sol is diluted by taking 1 or 2 drops of sol and mixing it with 20 mL of deionized distilled water. The diluted samples are sonicated (Ultrasonic Cleaner, Mettler Electronics Corp., Anaheim, Calif.) for 10 minutes and a drop of the diluted sample is placed on a 200 mesh Cu TEM grid with a carbon/Formvar film (Product 01801, Ted Pella, Inc, Redding, Calif.), and dried at ambient conditions.

The dried samples are imaged using a Transmission Electron Microscope (TEM) (HITACHI H-9000NAR, Hitachi, Ltd., Tokyo, Japan) at 300 kV with magnifications ranging from 10K times to 50K times depending on the particle sizes in each sample. Images are captured using Gatan Digital Micrograph software on a CCD camera (UL-TRASCAN 894, Gatan, Inc., Pleasanton, Calif.). Each image has a calibrated scale marker.

Particle sizes are measured using a single line through the center of each particle; thus, the measurements are based in the assumption that the particles are spherical. If a particular particle is non-spherical, the measurement line is taken through the longest axis of the particle. In each case, the number of measurements taken on individual particles exceeds that stipulated in the ASTM E122 test method for the error level of 5 nm.

Commercially available silicas include those available from Nalco Chemical Company, Naperville, Ill. (for example, NALCO 1040, 1042, 1050, 1060, 2326, 2327 and 2329); Nissan Chemical America Company, Houston, Tex. (e.g., SNOWTEX-ZL, -OL, -O, -N, -C, -20L, -40, and -50); Admatechs Co., Ltd., Japan (for example, SX009-MIE, SX009-MIF, SC1050-MJM, and SC1050-MLV); Grace GmbH & Co. KG, Worms, Germany (e.g., those available under the product designation LUDOX, e.g., P-W50, P-W30, P-X30, P-T40 and P-T4OAS); Akzo Nobel Chemicals GmbH, Leverkusen, Germany (e.g., those available under the product designation LEVASIL, e.g., 50/50%, 100/45%, 200/30%, 200A/30%, 200/40%, 200A/40%, 300/30% and 500/15%; and Bayer MaterialScience AG, Leverkusen, Germany (e.g., those available under the product designation DISPERCOLL S (e.g., 5005, 4510, 4020 and 3030).

The nanoparticles used in the present disclosure are surface treated. Generally, surface treatment agents for silica nanoparticles are organic species having a first functional group capable of covalently chemically attaching to the surface of a nanoparticle, wherein the attached surface treatment agent alters one or more properties of the nanoparticle.

Surface treatment agents often include more than one first functional group capable of attaching to the surface of a nanoparticle. For example, alkoxy groups are common first functional groups that are capable of reacting with free silanol groups on the surface of a silica nanoparticle forming a covalent bond between the surface treatment agent and the silica surface. Examples of surface treatment agents having multiple alkoxy groups include trialkoxy alkylsilanes (e.g., isooctyl trimethoxy silane). In some embodiments, surface treatment agents have no more than three functional groups for attaching to the core.

In some embodiments, the surface treatment agent further includes one or more additional functional groups providing one or more additional desired properties. For example, in some embodiments, an additional functional group may be selected to provide a desired degree of compatibility between the surface modified nanoparticles and one or more of the additional constituents of the resin system, e.g., one or more of the curable resins and/or reactive diluents. In some embodiments, an additional functional group may be selected to modify the rheology of the resin system, e.g., to increase or decrease the viscosity, or to provide non-Newtonian rheological behavior, e.g., thixotropy (shear-thinning).

In some embodiments, at least a portion of the surface-modified nanoparticles may be reactive. Thus, for at least some of the surface-modified nanoparticles, at least one of the surface treatment agents used to surface modify the nanoparticles includes a second functional group capable of reacting, e.g., crosslinking, with one or more of the materials in the pressure sensitive adhesive formulation.

For the adhesives of the present disclosure, at least one nanoparticle surface-modifying group is non-polymeric. Generally, non-polymeric surface modifying agents do not have any polymerized or copolymerized repeat units. In some embodiments, the non-polymeric surface modifying agents have molecular weight of less than 1500 gm/mole, e.g., less than 1000 gm/mole, e.g., less than 500 gm/mole. Exemplary non-polymeric surface modifying agents include trialkoxy alkyl silanes (e.g., isooctyl trimethoxy silane) and trialkoxy aryl silanes.

In addition to the non-polymeric surface modifying agent, the surface-modified nanoparticles are modified with at least one polymeric surface modifying agent. Generally, a "polymeric surface modifying group" comprises polymerized or copolymerized repeat units. As used herein, the term "polymeric surface modifying group" refers to both lower molecular weight polymeric surface modifying groups having 2 to 20 repeat units, as well as higher molecular weight species having 21 or more repeat units.

In some embodiments, the polymeric surface modifying agent comprises less than 10 repeat units, e.g., 5-9 repeat units, inclusive. In some embodiments, the polymeric surface modifying agent comprises at least 10 repeat units. In some embodiments, the polymeric surface modifying agent comprises 10 to 20 repeat units, inclusive. In some embodiments, the polymeric surface modifying agent includes at least than 100 repeat units, e.g., 100 to 200 repeat units, inclusive. In some embodiments, the polymeric surface modifying agent comprises no greater than 500 repeat units, e.g., no greater than 300 repeat units, or even no greater than 200 repeat units.

In some embodiments, the polymeric surface modifying groups have a number average molecular weight of at least 500 gm/mole, e.g., at least 1000 gm/mole, e.g., at least 1500 gm/mole, e.g., at least 2000 gm/mole, or even at least 2500 gm/mole. In some embodiments, the number average molecular weight of the polymeric surface modifying group may be as high as 30,000 gm/mole, or even 50,000 gm/mole. However, in some embodiments, the number average molecular weight of the polymeric surface modifying group may be no greater than 30,000 gm/mole, e.g., no greater than 10,000 gm/mole, or even no greater than 6,000 gm/mole. For the polymeric surface-modifying agents, the number average molecular weight is calculated according to the Polymer Silane Molecular Weight Calculation described herein.

In some embodiments, one or more of the polymeric surface-modifying agents may be reactive. That is, the polymeric surface-modifying agent includes a functional group that reacts, e.g., crosslinks, with the acrylic copolymer. In some embodiments, the functional group comprises a hydrogen-extracting group. In some embodiments, the hydrogen-extracting group comprises benzophenone.

In some embodiments, both the acrylate polymer and the polymeric surface modifying group comprises at least one (meth)acrylate and at least one vinyl carboxylic acid. In some embodiments, the components of the acrylate adhesive and the polymeric surface modifying agent are the same, i.e., both comprise the same (meth)acrylate monomer(s) and vinyl carboxylic acid(s). In some embodiments, the acrylate adhesive and the polymeric surface modifying agent may have different compositions. For example, in some embodiments, the acrylate polymer or the polymeric surface modifying agent may include different or addition (meth)acrylate monomers, e.g., a non-polar (meth)acrylate.

Regardless of whether the same or different (meth)acrylate and/or vinyl carboxylic acid monomers are used, in some embodiments, the weight percent of vinyl carboxylic in each component may be similar or different. For example, in some embodiments, the acrylate polymer comprises $W_{AP}$ percent by weight of the vinyl carboxylic acid based on the total weight of the vinyl carboxylic acid monomers and the (meth)acrylate monomers of the acrylate polymer and the polymeric silane surface modifying group comprises $W_{OS}$ percent by weight of the vinyl carboxylic acid based on the total weight of the vinyl carboxylic acid monomers and the (meth)acrylate monomers of the polymeric silane surface modifying group.

In some embodiments, the ratio of $W_{OS}/W_{AP}$ is between 0.8 and 1.2, inclusive. For such systems where the ratio of $W_{OS}/W_{AP}$ is close to 1, the polymeric surface-modifying agent will likely be more compatible with the acrylate polymer. In some embodiments, the ratio of $W_{OS}/W_{AP}$ is less than 0.5 or greater than 2, e.g., less 0.2 or greater than 5, or even less than 0.1 or greater than 10. For such systems where the ratio of $W_{OS}/W_{AP}$ is far from 1, the polymeric surface-modifying agent will likely be less compatible with the acrylate polymer. Of course, the degree of compatibility or incompatibility depends on other factors such as the similarity between the (meth)acrylate monomers used in both the acrylate polymer and the polymeric silane, as well as the difference in their respective vinyl carboxylic acid contents.

Examples

TABLE 1

Description of materials used in the preparation of examples.

| Component | Description | Source |
|---|---|---|
| AA | acrylic acid | |
| IOA | isooctyl acrylate | |
| IBOA | isobornyl acrylate | |
| BA | n-butyl acrylate | |
| I-651 | 2,2-dimethoxy-2-phenylacetophenone, (IRGACURE 651 photoinitiator) | CIBA Corporation Tarrytown, New York |
| I-184 | 1-hydroxycyclohexyl phenyl ketone, (IRGACURE 184 photoinitiator) | CIBA Corporation Tarrytown, New York |
| VAZO 67 | 2,2'-azobis(2-methylbutyronitrile), (VAZO 67 free radical thermal initiator) | E. I. du Pont de Nemours and Company, Wilmington, DE |
| F85 | glycerol ester of hydrogenated rosin (FORAL 85 tackifier) | Hercules Incorporated, Wilmington, Delaware |
| R6108 | hydrocarbon resin (REGALREZ 6108 tackifier) | Eastman Chemical Company, Kingsport, Tennessee |
| SNP-75 | Aqueous colloidal silica sol (40.0% solids), having an average particle size of 75 nanometers (nm) (NALCO 2329) | Nalco Company of Naperville, Illinois |

TABLE 1-continued

Description of materials used in the preparation of examples.

| Component | Description | Source |
|---|---|---|
| SNP-20 | Aqueous colloidal silica sol (41.1% solids), having an average particle size of 20 nanometers (nm) (NALCO 2327) | Nalco Company of Naperville, Illinois |
| IOTMS | Isooctyl trimethoxy silane | |
| MPTMS | (3-mercaptopropyl)trimethoxysilane (MPTMS, a chain transfer agent) | Aldrich Chemical Company, Inc., Milwaukee, Wisconsin |
| 1M2P | 1-methoxy-2-propanol | |
| ABP | acryloxybenzophenone, a copolymerizable benzophenone crosslinker. | |
| TRZ | 2,4-bis(trichloromethyl)-6-6(4-methoxyphenyl)-sym-triazine, a crosslinker | |

Test Methods

Peel Adhesion Procedure. The 90° angle peel adhesion strength of a tape sample to stainless steel (StS), polypropylene (PP), or high density polyethylene (HDPE) was measured in the following manner, which is generally in accordance with the test method described in Pressure Sensitive Tape Council PSTC-101 method F (Rev May 2007) "Peel Adhesion of Pressure Sensitive Tape." The test was run at 23° C. (73° F.) and 50% relative humidity (RH).

A sample of an adhesive transfer tape was cut 1.27 cm wide and approximately 20 cm in length using a specimen razor cutter. The cut sample was applied with its exposed adhesive side down and lengthwise onto the surface of a test panel measuring 12.5 cm long by 5 cm wide. The applied sample was rubbed down on the test panel using light thumb pressure and trimmed to the length of the panel. The release liner was carefully removed to expose the other side of the adhesive. A strip of aluminum foil 1.59 cm wide, approximately 20 cm long, and 50 micrometers thick was placed centered and lengthwise onto the exposed adhesive on the test panel, fully covering the exposed adhesive with the remaining length extending lengthwise beyond one edge of the test panel. The test panel with the adhesive-backed aluminum foil was rolled twice with a 2 kg rubber roller at a rate of 61 cm/minute.

For the 15 minute results, the samples were then equilibrated for 15 minutes at 23° C. and 50% relative humidity. For the 72 hour results, the samples were then equilibrated for 72 hours at 23° C. and 50% relative humidity.

After equilibration, the samples were placed in a 90° angle test fixture on a peel adhesion tester (either Slip/Peel Tester, Model 3M90, obtained from Instrumentors, Incorporated, Strongsville, Ohio; or INSTRON Tensile tester, Model 4465, obtained from INSTRON, Norwood, Mass.). The extended aluminum foil end was secured in the clamps of the adhesion tester and the peel adhesion was measured at a peel rate of 30.5 cm/min. A minimum of two test specimens were evaluated with results obtained in ounce-force/inch which were used to calculate the average peel force. This was then converted to Newtons per decimeter (N/dm).

Shear Procedure. The "shear time," a measure of the ability of a pressure sensitive adhesive tape to remain adhered to a substrate at an elevated temperature while under a constant load applied in a direction parallel to the surface of the tape and substrate, was evaluated in the following manner, which is generally in accordance with the test method described in Pressure Sensitive Tape Council PSTC-107 Rev October 2003) "Shear Adhesion of Pressure Sensitive Tape", Procedure B.

A sample of an adhesive transfer tape was placed on a flat surface with its exposed adhesive face up. A strip of aluminum foil measuring 2.54 cm wide and approximately 10 cm in length was applied to the surface of the adhesive, extending approximately 5 cm in length beyond the edge of the adhesive surface. The resulting adhesive-backed aluminum foil was cut into a test sample measuring 1.27 cm wide and approximately 10 cm in length using a specimen razor cutter. The release liner was carefully removed from the side of the test sample opposite the aluminum foil, exposing the test surface of the sample adhesive. An approximately 3.8 cm length of the test sample was applied sample adhesive side down and lengthwise to the surface of a stainless steel test panel measuring 7.6 cm long and 5.1 cm wide with the remaining length of the test sample extending beyond one edge of the panel. A cut-off fixture (Shear Cutoff Fixture, Model SCF-100, obtained from Chem Instruments Incorporated, Fairfield, Ohio) was used to trim down the length of test sample on the test panel to 2.54 cm. The test sample was rolled down twice with a 2 kg rubber roller at a rate of 61 cm per minute. An aluminum hook was secured to the extended end of the test sample such that a weight would evenly distribute across the sample when hung from the hook.

The test panel with test sample and hook was placed in a timing stand positioned such that the panel was disposed at an angle of 2 degrees to the vertical with the hook end extended downward at an angle of 178 degrees to the test panel. The timing stand included a hanging rack and stop switches linked to a timer. A 500 gram or 1000 gram weight was hung carefully onto the hook and the timer was set to zero. The timing stand was located in either a room with a controlled temperature of 23° C. and 50% RH, or a forced air oven set to 70° C. or 149° C. If the weight fell before 10,000 minutes, the time that the weight fell was recorded in minutes. For samples that did not fall, the weight was removed after 10,000 minutes and the shear time was reported as 10,000+ minutes. The shear time" was calculated as the average of two test panels and reported in minutes.

Percent Solids Procedure. The weight percent solids of the surface-modified nanoparticles in solution were determined gravimetrically as follows. A sample was placed in an aluminum dish and weighed. After drying at 120° C. for 3 hours, sample was weighed again and the weight change was used to calculate the weight percent solids.

Polymeric Silane Molecular Weight Calculation. The number average molecular weight of the polymeric silane surface-modifying agents was calculated according to the following equation:

$$M_n = \frac{m}{n*f*I + x*CTA}$$

wherein,
Mn=number average molecular weight, g/mol;
m=weight of monomer, g;
f=initiator efficiency;
x=chain transfer agent (CTA) efficiency;
n=number of initiating species per mole of initiator;
I=moles of initiator; and
CTA=moles of chain transfer agent Preparation of Silane Functional Polymers: P1-P7.

Various silane functional polymers with targeted molecular weights were prepared as follows. The compositions of the silane functional polymers are summarized in Table 2a and were prepared by solution polymerization in ethyl acetate ("EthAc").

A glass bottle was charged with acrylate monomer(s) and (3-mercaptopropyl)trimethoxysilane. The mixture was diluted with ethyl acetate up to 35 wt. %-40 wt. % solids and 0.0385 grams of VAZO 64 thermal initiator was added. The solution was purged with nitrogen for 20 minutes then capped and placed in a constant temperature bath set at 60° C. with gentle agitation for 24 hours. The resulting silane-functional polymers are summarized in Table 2b.

TABLE 2a

Compositions of silane-functional polymers P1 through P7.

| I.D. | IOA (g) | IBOA (g) | AA (g) | BA (g) | ABP (g) | MPTMS (g) | EthAc (g) |
|---|---|---|---|---|---|---|---|
| P1 | 18 | — | 2 | — | — | 1.49 | 32 |
| P2 | 18 | — | 2 | — | — | 0.099 | 32 |
| P3 | 18 | — | 2 | — | 0.061 | 1.49 | 32 |
| P4 | 3.34 | — | 0.16 | 16.5 | — | 1.49 | 32 |
| P5 | 3.34 | 16.5 | 0.16 | — | — | 1.49 | 32 |
| P6 | 16.7 | 82.5 | 0.8 | — | — | 4.56 | 150 |
| P7 | 16.7 | 82.5 | 0.8 | — | — | 0.71 | 150 |

TABLE 2b

Polymeric silane surface modifying agents P1 through P7.

| I.D. | Monomers | Weight Ratio | MW (g/mol) | Repeat Units (*) | Reactive |
|---|---|---|---|---|---|
| P1 | IOA:AA | 90:10 | 3000 | 17 | No |
| P2 | IOA:AA | 90:10 | 30,000 | 173 | No |
| P3 | IOA:AA:ABP | 90:10:0.1 | 3000 | 17 | Yes |
| P4 | BA:IOA:AA | 82.5:16.7:0.8 | 3000 | 15 | No |
| P5 | IBOA:IOA:AA | 82.5:16.7:0.8 | 3000 | 12 | No |
| P6 | IBOA:IOA:AA | 82.5:16.7:0.8 | 5000 | 19 | No |
| P7 | IBOA:IOA:AA | 82.5:16.7:0.8 | 30,000 | 115 | No |

(*) estimated from the calculated molecular weight based on the assumed stoichiometric structure of the polymeric surface modifying agent.

Preparation of Modified Nanoparticles (MNP).

Silica Nanoparticles Modified with Isooctyl Trimethoxysilane (IOTMS).

A series of silica nanoparticles modified with isooctyl trimethoxysilane, a non-polymeric silane surface modifying agent, were prepared as shown in Table 3 in the following manner. An aqueous colloidal silica sol (SNP-20 or SNP-75) was diluted in 1M2P. A solution of IOTMS in 1M2P was added slowly over 20 minutes to the diluted silica nanoparticle solutions. This mixture was further diluted with additional 1M2P and then heated at 80° C. for 24 hours. After removing the heat source, the reaction mixture was cooled down to room temperature. IOA monomer was added to the modified particles and the resulting mixture was placed under vacuum to remove all of the 1M2P and ethyl acetate solvents. The resulting modified nanoparticles were obtained in a range of 25 to 100 wt. % solids depending on the amount of IOA monomer remaining. The 100% solids materials were employed immediately to avoid agglomeration. Those materials containing some residual IOA monomer were used within 1 to 2 days.

Silica Nanoparticles Modified with Silane Functional Polymers P1-P7.

A series of silica nanoparticles modified with IOTMS and silane functional polymers were prepared as shown in Table 3 in the following manner. An aqueous colloidal silica sol (SNP-20 or SNP-75) was diluted in 1M2P. The desired amounts of a solution of IOTMS diluted in 1M2P and a solution of a silane modified polymer (P1-P7) in ethyl acetate were added slowly over 20 minutes to previously diluted silica sol. The resulting mixture was further diluted with additional 1M2P and then heated at 80° C. for 24 hours. After removing the heat source, the reaction mixture was cooled down to room temperature. IOA monomer was added to the modified particles and the resulting mixture was placed under vacuum to remove all of the 1M2P and ethyl acetate solvents. The resulting modified nanoparticles were obtained in a range of 25 to 100 wt. % solids depending on the amount of IOA monomer remaining. The 100% solids materials were employed immediately to avoid agglomeration. Those materials containing some residual monomer were used within 1 to 2 days.

TABLE 3

Surface-modified silica nanoparticles (SNP-20 and SNP-75).

| MNP I.D. | 1M2P (gm) | SNP (nm) | SNP (gm) | IOTMS (gm) | IOTMS mole % | Silane Modified Polymer I.D. | Silane Modified Polymer (gm) | Silane Modified Polymer mole % |
|---|---|---|---|---|---|---|---|---|
| 1 | 200 | 20 | 100 | 5.97 | 100 | — | — | 0 |
| 2 | 250 | 20 | 100 | 4.78 | 80 | P6 | 25.1 | 20 |
| 3 | 125 | 20 | 50 | 1.79 | 60 | P6 | 25.1 | 40 |
| 4 | 250 | 20 | 50 | 2.39 | 80 | P7 | 87.1 | 20 |
| 5 | 200 | 75 | 100 | 1.41 | 100 | — | — | 0 |
| 6 | 200 | 75 | 100 | 1.12 | 80 | P1 | 3.6 | 20 |
| 7 | 100 | 75 | 40 | 0.45 | 80 | P2 | 14.4 | 20 |
| 8 | 70 | 75 | 40 | 0.45 | 80 | P3 | 3.0 | 20 |
| 9 | 70 | 75 | 40 | 0.45 | 80 | P4 | 3.43 | 20 |
| 10 | 70 | 75 | 40 | 0.45 | 80 | P5 | 3.13 | 20 |
| 11 | 200 | 75 | 50 | 1.13 | 80 | P6 | 5.91 | 20 |
| 12 | 200 | 75 | 50 | 0.84 | 60 | P6 | 11.8 | 40 |
| 13 | 250 | 75 | 50 | 1.13 | 80 | P7 | 41.0 | 20 |

The resulting modified nanoparticles were blended in to acrylic syrup copolymers to obtain pressure sensitive adhesive compositions with high performance shear and peel properties.

PSA Preparation Procedure.

Step 1. A partially polymerized mixture was made by mixing the monomer components of the acrylate adhesive (i.e., isooctyl acrylate (IOA) and acrylic acid (AA)), a photoinitiator, and the surface-modified nanoparticles (MNP). For each sample, the monomers amounts are shown in weight percent based on the total weight of the monomers. The amount of IOA includes any residual IOA monomer present in the modified nanoparticle component. The amounts of the other components (e.g., the initiator and the MNP) are shown in parts by weight per hundred parts by weight of the monomers. The mixture was then inerted by bubbling a nitrogen gas stream into it for between 5 and 15 minutes. The inerted mixture was then exposed to UVA radiation with two 350BL lamps (available from Osram Sylvania, Danvers, Mass.) to create a partially polymerized syrup mixture with a coatable viscosity of approximately 2000 centipoise (cps) (less than 2 minutes). At this point the air was introduced to the syrup to stop the polymerization, resulting in a partially-polymerized syrup.

Step 2. Next, additional components were added to the partially polymerized syrup to provide a coating composition. For each example, these components are shown in parts by weight per hundred parts by weight of the monomers used to prepare the partially polymerized syrup in Step 1. This mixture was then gently shook or rolled to make a homogeneous coating composition.

Step 3. The resulting coating composition was coated onto the high release side of a differentially siliconized poly-coated kraft paper release liner using a notched bar coater to form a continuous web approximately 0.051 millimeters (0.002 inches) thick. The coating was then exposed to UVA irradiation from 350BL lamps (available from Osram Sylvania, Danvers, Mass.) in a nitrogen inerted atmosphere to form a cured adhesive transfer tape on a release liner. The UVA radiation was measured by a UV PowerMAP radiometer obtained from EIT Incorporated, Sterling, Va.

Step 4. Optionally, in some examples, the resulting adhesive transfer tape was further exposed to UVC irradiation using 1.6 cm diameter, 20 watt germicidal bulbs (available from Voltarc Technolgies, Inc., Waterbury, Conn.) in a nitrogen inerted atmosphere to form the final adhesive transfer tape. The UVC radiation was measured by a UV PowerMAP radiometer obtained from EIT Incorporated, Sterling, Va.

Data Set A. Reference Example REF-A1, Examples A1 through A3, and Comparative Examples CE-A1 through CE-A3. Data Set A adhesives were based on a 90:10 IOA:AA adhesive composition including a crosslinker combined with nanoparticles modified with a compatible, non-reactive polymer tether (90:10 IOA:AA, 3000 MW). The adhesives were cured with UVA light only.

Samples were prepared according to the PSA Preparation Procedure. In Step 1, the partially polymerized solution was prepared from 90 wt. % IOA, 10 wt. % AA and 0.040 pph I-651 photoinitiator. The type and amount of modified nanoparticles is summarized in Table 4. In Step 2, 0.10 pph TRZ crosslinker and an additional 0.16 pph I-651 photoinitiator were added. In Step 3, the UVA intensity was 160 millijoules per square centimeter. The cured pressure-sensitive adhesives were evaluated for Shear Time at 149° C. on StS using a 1000 g weight, 15 Minute Peel Adhesion Strength on StS, and 72 Hour Peel Adhesion Strength on StS, as described in the test methods above. The results are shown in Table 4.

TABLE 4

Composition and results for Data Set A.

| | MNP | | Results on Stainless Steel (StS) | | |
|---|---|---|---|---|---|
| EX | I.D. | pph | NP:P (*) | Shear (+) (min) | 15 min Peel (N/dm) | 72 Hr Peel (N/dm) |
| REF-A1 | None | 0 | — | 144 | 86 | 146 |
| A1 | MNP-6 | 5 | 80:20 | 10000+ | 98 | 208 |
| A2 | MNP-6 | 10 | 80:20 | 10000+ | 122 | 180 |
| A3 | MNP-6 | 15 | 80:20 | 10000+ | 94 | 160 |
| CE-A1 | MNP-5 | 5 | 100:0 | 10000+ | 90 | 209 |
| CE-A2 | MNP-5 | 10 | 100:0 | 10000+ | 81 | 218 |
| CE-A3 | MNP-5 | 15 | 100:0 | 5307 | 88 | 171 |

(*) Mole percent ratio of Non-polymeric surface modifier (IOTMS) to Polymeric surface modifier.
(+) Shear at 149° C. with a 1000 g load.

As show in Table 4, the use of compatible, non-reactive polymeric surface-modifying agents provided the desired combination of improved high temperature shear, 15 minute peel and 72 hour peel.

Data Set B. Reference Example REF-B1, Example B1 and Comparative Example CE-B1. Data Set B adhesives were based on a 94:6 IOA:AA adhesive composition including a crosslinker combined with nanoparticles modified with a compatible, non-reactive polymer tether (90:10 IOA:AA). The adhesives were cured with UVA light only.

Samples were prepared according to the PSA Preparation Procedure. In Step 1, the partially polymerized solution was prepared from 94 wt. % IOA, 6 wt. % AA and 0.040 pph I-651 photoinitiator. The type and amount of modified nanoparticles is summarized in Table 5. In Step 2, 0.10 pph TRZ crosslinker and an additional 0.16 pph I-651 photoinitiator were added. In Step 3, the UVA intensity was 160 millijoules per square centimeter. The cured pressure-sensitive adhesives were evaluated for Shear Time at 149° C. on StS using a 1000 g weight, 15 Minute Peel Adhesion Strength on StS, and 72 Hour Peel Adhesion Strength on StS, as described in the test methods above. The results are shown in Table 5.

TABLE 5

Composition and results for Data Set B.

| | MNP | | Results on Stainless Steel (StS) | | |
|---|---|---|---|---|---|
| EX | I.D. | pph | NP:P (*) | Shear (+) (min) | 15 min Peel (N/dm) | 72 Hr Peel (N/dm) |
| REF-B1 | None | 0 | — | 74 | 91 | 109 |
| B1 | MNP-6 | 10 | 80:20 | 561 | 79 | 156 |
| CE-B1 | MNP-5 | 10 | 100:0 | 137 | 73 | 153 |

(*) Mole percent ratio of Non-polymeric surface modifier (IOTMS) to Polymeric surface modifier.
(+) Shear at 149° C. with a 1000 g load.

As show in Table 5, the use of compatible, non-reactive polymeric surface-modifying agents provided the desired combination of improved high temperature shear, 15 minute peel and 72 hour peel.

Data Set C. Reference Example REF-C1, Examples C1 through C3, and Comparative Examples CE-C1 and CE-C2. Data Set C adhesives were based on a tackified 93.5:6.5 IOA:AA adhesive composition including a crosslinker combined with nanoparticles modified with a compatible, non-reactive polymer tether (90:10 IOA:AA, 3000 MW for MNP-6 and 30,000 MW for MNP-7). The adhesives were cured with UVA light only.

Samples were prepared according to the PSA Preparation Procedure. In Step 1, the partially polymerized solution was prepared from 93.5 wt. % IOA, 6.5 wt. % AA, and 0.040 pph I-184 photoinitiator. The type and amount of modified nanoparticles is summarized in Table 6. In Step 2, 0.15 pph TRZ crosslinker and an additional 0.35 pph I-184 photoinitiator were added. F85 tackifier (10 pph) was also added in Step 2. In Step 3, the UVA intensity was 426 millijoules per square centimeter. The cured pressure-sensitive adhesives were evaluated for Shear Time at 23° C. and 50% RH on StS using a 1000 g weight, 15 Minute Peel Adhesion Strength on StS and HDPE, and 72 Hour Peel Adhesion Strength on StS and HDPE, as described in the test methods above. The results are shown in Table 6.

TABLE 6

Composition and results for Data Set C.

| | MNP | | Shear (+) | Peel (N/dm) | | | |
|---|---|---|---|---|---|---|---|
| EX | I.D. | pph | NP:P (*) | StS (min) | 15 min StS | 72 Hr StS | 15 min HDPE | 72 Hr HDPE |
| REF-C1 | None | 0 | — | 10000+ | 58 | 94 | 25 | 27 |
| C1 | MNP-6 | 10 | 80:20 | 10000+ | 66 | 134 | 29 | 35 |
| C2 | MNP-6 | 15 | 80:20 | 10000+ | 81 | 120 | 29 | 31 |
| C3 | MNP-7 | 10 | 80:20 | 10000+ | 57 | 103 | 29 | 39 |
| CE-C1 | MNP-5 | 10 | 100:0 | 6899 | 72 | 128 | 27 | 31 |
| CE-C2 | MNP-5 | 15 | 100:0 | 2630 | 77 | 132 | 27 | 34 |

(*) Mole percent ratio of Non-polymeric surface modifier (IOTMS) to Polymeric surface modifier.
(+) Shear at 23° C. with a 1000 g load.

As show in Table 6, as compared to nanoparticles modified with only non-polymeric surface-modifying agent (CE-C1 and CE-C2), the use of compatible, non-reactive polymeric surface-modifying agents provided improved 15 minute peel and 72 hour peel on both high surface energy (stainless steel) and low surface energy (HDPE) substrates, without sacrificing shear performance.

Data Set D. Reference Example REF-D1, Examples D1 through D6, and Comparative Examples CE-D1 through CE-D3. Data Set D adhesives were based on a 90:10 IOA:AA adhesive composition including a crosslinker. The adhesives contained nanoparticles modified with either compatible reactive or compatible non-reactive polymer tethers. The adhesives were cured with both UVA light (Step 3) and UVC light (Step 4).

Samples were prepared according to the PSA Preparation Procedure. In Step 1, the partially polymerized solution was prepared from 90 wt. % IOA, 10 wt. % AA, and 0.040 pph I-651 photoinitiator. The type and amount of modified nanoparticles are summarized in Table 7. In Step 2, 0.10 pph TRZ crosslinker and an additional 0.16 pph I-651 photoinitiator were added. In Step 3, the UVA intensity was 160 millijoules per square centimeter. In Step 4, the UVC intensity was 47 millijoules per square centimeter. The cured pressure-sensitive adhesives were evaluated for Shear Time at 149° C. on StS using a 1000 g weight, 15 Minute Peel Adhesion Strength on StS, and 72 Hour Peel Adhesion Strength on StS, as described in the test methods above. The results are shown in Table 7.

TABLE 7

Composition and results for Data Set D.

| | MNP | | | Shear (+) | Peel (N/dm) | |
|---|---|---|---|---|---|---|
| EX | I.D. | pph | NP:P (*) | Reactive | StS (min) | 15 min StS | 72 Hr StS |
| REF-D1 | None | 0 | — | — | 10000+ | 91 | 147 |
| D1 | MNP-6 | 5 | 80:20 | No | 10000+ | 69 | 207 |
| D2 | MNP-6 | 10 | 80:20 | No | 10000+ | 78 | 197 |
| D3 | MNP-6 | 15 | 80:20 | No | 10000+ | 75 | 172 |
| D4 | MNP-8 | 5 | 80:20 | Yes | 10000+ | 76 | 199 |
| D5 | MNP-8 | 10 | 80:20 | Yes | 10000+ | 73 | 221 |
| D6 | MNP-8 | 15 | 80:20 | Yes | 10000+ | 54 | 168 |
| CE-D1 | MNP-5 | 5 | 100:0 | No | 10000+ | 84 | 196 |
| CE-D2 | MNP-5 | 10 | 100:0 | No | 10000+ | 97 | 201 |
| CE-D3 | MNP-5 | 15 | 100:0 | No | 10000+ | 60 | 205 |

(*) Mole percent ratio of Non-polymeric surface modifier (IOTMS) to Polymeric surface modifier.
(+) Shear at 149° C. with a 1000 g load.

Data Set E. Reference Example REF-E1, Examples E1 and E2, and Comparative Example CE-E1. Data Set E adhesives were based on a 94:6 IOA:AA adhesive composition including a crosslinker. The adhesives contained nanoparticles modified with either compatible reactive or compatible non-reactive polymer tethers. The adhesives were cured with both UVA light (Step 3) and UVC light (Step 4).

Samples were prepared according to the PSA Preparation Procedure. In Step 1, the partially polymerized solution was prepared from 94 wt. % IOA, 6 wt. % AA, and 0.040 pph I-651 photoinitiator. The type and amount of modified nanoparticles are summarized in Table 8. In Step 2, 0.10 pph TRZ crosslinker and an additional 0.16 pph I-651 photoinitiator were added. In Step 3, the UVA intensity was 160 millijoules per square centimeter. In Step 4, the UVC intensity was 47 millijoules per square centimeter. The cured pressure-sensitive adhesives were evaluated for Shear Time at 23° C. on StS using a 1000 g weight, 15 Minute Peel Adhesion Strength on StS, and 72 Hour Peel Adhesion Strength on StS, as described in the test methods above. The results are shown in Table 8.

TABLE 8

Composition and results for Data Set E.

| | MNP | | | Shear (+) | Peel (N/dm) | |
|---|---|---|---|---|---|---|
| EX | I.D. | pph | NP:P (*) | Reactive | StS (min) | 15 min StS | 72 Hr StS |
| REF-E1 | None | 0 | — | — | 10000+ | 72 | 126 |
| E1 | MNP-6 | 10 | 80:20 | No | 10000+ | 73 | 144 |
| E2 | MNP-8 | 10 | 80:20 | Yes | 10000+ | 80 | 173 |
| CE-E1 | MNP-5 | 10 | 100:0 | No | 10000+ | 77 | 169 |

(*) Mole percent ratio of Non-polymeric surface modifier (IOTMS) to Polymeric surface modifier.
(+) Shear at 23° C. with a 1000 g load.

Data Set F. Reference Examples REF-F1 and REF-F2, and Examples F1 through F4. This data set shows that use of a dissimilar polymer tether and PSA matrix can provide an advantageous balance of properties. The adhesives of REF-F1 and Examples F1 and F2 were based on a 90:10 IOA:AA adhesive composition including a crosslinker. Generally, high acrylic acid content adhesives are thought to be suitable for use on high surface energy substrates. The adhesives of REF-F2 and Examples F3 and F4 were based on a tackified 99.1:0.9:20.0 IOA:AA:IBOA adhesive composition including a crosslinker. Generally, very low acrylic acid content adhesives are thought to suitable for use on low surface energy substrates. The adhesives of Examples F1 through F4 contained nanoparticles modified with incompatible non-reactive polymer tethers. The adhesives were cured with UVA light only.

Samples were prepared according to the PSA Preparation Procedure. For Reference Example REF-F1 and Examples F1 and F2, in Step 1, the partially polymerized solution was prepared from 90 wt. % IOA, 10 wt. % AA, and 0.040 pph I-651 photoinitiator. The type and amount of modified nanoparticles are summarized in Table 9. In Step 2, an additional 0.16 pph I-651 photoinitiator was added, and in Step 3, the UVA intensity was 169 millijoules per square centimeter.

For Reference Example REF-F2 and Examples F3 and F4, in Step 1, the partially polymerized solution was prepared from 99.1 wt. % IOA, 0.9 wt. % AA, and 0.040 pph I-651 photoinitiator. The type and amount of modified nanoparticles are summarized in Table 9. In Step 2, 0.17 pph TRZ crosslinker, an additional 0.20 pph I-651 photoinitiator, and 20.0 pph IBOA monomer were added. Also, 28.8 pph R6108 hydrocarbon resin tackifier were added. In Step 3, the UVA intensity was 631 millijoules per square centimeter.

The cured pressure-sensitive adhesives were evaluated for Shear Time at 70° C. on StS using a 1000 g weight. 15 Minute and 72 Hour Peel Adhesion Strength on a high surface energy substrate (i.e., stainless steel) and a low surface energy substrate (i.e., polypropylene) were measured as described in the test methods above. The results are shown in Table 9.

TABLE 9

Composition and results for Data Set F.

| EX | MNP I.D. | pph | NP:P (*) | Shear (+) StS. (min) | Peel (N/dm) 15 min StS | 72 Hr StS | 15 min PP | 72 Hr PP |
|---|---|---|---|---|---|---|---|---|
| REF-F1 | None | 0 | — | 10000+ | 84 | 132 | 20 | 28 |
| F1 | MNP-10 | 10 | 80:20 | 10000+ | 88 | 191 | 20 | 40 |
| F2 | MNP-9 | 10 | 80:20 | 10000+ | 95 | 149 | 22 | 25 |
| REF-F2 | None | 0 | — | 1154 | 77 | 94 | 62 | 74 |
| F3 | MNP-10 | 10 | 80:20 | 10000+ | 62 | 86 | 45 | 75 |
| F4 | MNP-9 | 10 | 80:20 | 10000+ | 69 | 109 | 75 | 82 |

(*) Mole percent ratio of Non-polymeric surface modifier (IOTMS) to Polymeric surface modifier.
(+) Shear at 70° C. with a 1000 g load.

In the examples with the PSA matrix suited for a HSE surface (Examples F1 and F2), adding nanoparticles surface modified with polymer tethers having poor compatibility with the PSA provided improved 15 min and 72 hour peel to stainless steel, a HSE substrate, without sacrificing shear. In addition, the use of a polymer tether (MNP-10) incorporating a high Tg monomer (IBOA, Tg of 104° C.) provided superior peel performance on PP, a low surface energy substrate, when compared to a tether of similar compatibility (MNP-9), but incorporating a low Tg monomer (BA, Tg of −49° C.).

In the examples with the PSA matrix suited for LSE surfaces (Examples F3 and F4), the addition of the nanoparticles modified with polymer tethers having good compatibility with the PSA improves shear. Superior peel results on stainless steel and polypropylene were obtained when using the polymer tether that incorporates a low Tg monomer (MNP-9 polymer silane—82.5/16.7/0.8 BA/IOA/AA) as compared to the polymer tether that incorporates a high Tg monomer (MNP-10 polymer silane—82.5/16.7/0.8 IBOA/IOA/AA).

Data Set G. Data Set G adhesives were based on a 90:10 IOA:AA adhesive composition. The effects of including modified nanoparticles, including a crosslinker in the PSA matrix, and using UVC irradiation were explored.

Samples were prepared according to the PSA Preparation Procedure. In Step 1, the partially polymerized solution was prepared from 90 wt. % IOA, 10 wt. % AA, and 0.040 pph I-651 photoinitiator. Also, 10 pph of MNP-8 reactive, polymeric, surface-modified nanoparticles were added. In Step 2, additional I-651 photoinitiator and, optionally, a crosslinker (TRZ crosslinker) were added, as summarized in Table 10. All samples were cured with only UVA (Step 3); thus, the reactive polymer tethers of the modified nanoparticles remained uncrosslinked with the adhesive matrix. Some samples were also subsequently cured with UVC (Step 4), crosslinking the reactive polymer tethers of the modified nanoparticles with the adhesive matrix.

TABLE 10

Compositions of the adhesives of Data Set G.

| EX | MNP (10 pph) | TRZ (pph) | I-651 (pph) | UVA (mJ/sqcm) | UVC (mJ/sqcm) |
|---|---|---|---|---|---|
| REF-G1 | none | 0 | 0.15 | 169 | 0 |
| G1 | MNP-8 | 0 | 0.15 | 169 | 0 |
| REF-G2 | none | 0 | 0.15 | 169 | 47 |
| G2 | MNP-8 | 0 | 0.15 | 169 | 47 |
| REF-G3 | none | 0.10 | 0.16 | 160 | 0 |
| G3 | MNP-8 | 0.10 | 0.16 | 160 | 0 |
| REF-G4 | none | 0.10 | 0.16 | 160 | 47 |
| G4 | MNP-8 | 0.10 | 0.16 | 160 | 47 |

The cured pressure-sensitive adhesives were evaluated for Shear Time at 23° C. and 50% RH on StS using a 1000 g weight, 15 Minute Peel Adhesion Strength on StS, and 72 Hour Peel Adhesion Strength on StS, as described in the test methods above. The results are shown in Table 11.

TABLE 11

Adhesion properties to stainless steel of the adhesives of Date Set G.

| EX | Crosslinker in PSA | MNP | UVC cure | Shear (+) (min) | 15 Min peel (N/dm) | 72 Hr Peel (N/dm) |
|---|---|---|---|---|---|---|
| REF-G1 | No | No | No | 188 | 62 | 112 |
| G1 | No | Yes | No | 192 | 58 | 120 |
| REF-G2 | No | No | Yes | 352 | 61 | 115 |
| G2 | No | Yes | Yes | 244 | 48 | 126 |
| REF-G3 | Yes | No | No | 10000+ | 86 | 146 |
| G3 | Yes | Yes | No | 10000+ | 95 | 195 |
| REF-G4 | Yes | No | Yes | 10000+ | 91 | 147 |
| G4 | Yes | Yes | Yes | 10000+ | 73 | 221 |

(+) Shear at 23° C. and 50% RH with a 1000 g load.

Data Set H. Reference Example REF-H1, Examples H1 through H14, and Comparative Examples CE-H1 through CE-H4. The adhesives of Data Set H were based on a 90:10 IOA:AA adhesive composition including a crosslinker. Samples were prepared using both 20 and 75 nm silica nanoparticles. The nanoparticles were modified with non-reactive polymeric tethers with various ratios of non-polymeric to polymeric surface modification. The adhesives were cured with both UVA and UVC light.

Samples were prepared according to the PSA Preparation Procedure. In Step 1, the partially polymerized solution was prepared from 90 wt. % IOA, 10 wt. % AA, and 0.040 pph I-651 photoinitiator. The type and amount of modified nanoparticles are summarized in Table 12. In Step 2, an additional 0.15 pph I-651 photoinitiator and 0.10 pph TRZ crosslinker were added. In Step 3, the UVA intensity was 191 millijoules per square centimeter. In Step 4, the UVC intensity was 60 millijoules per square centimeter.

Figure 2:
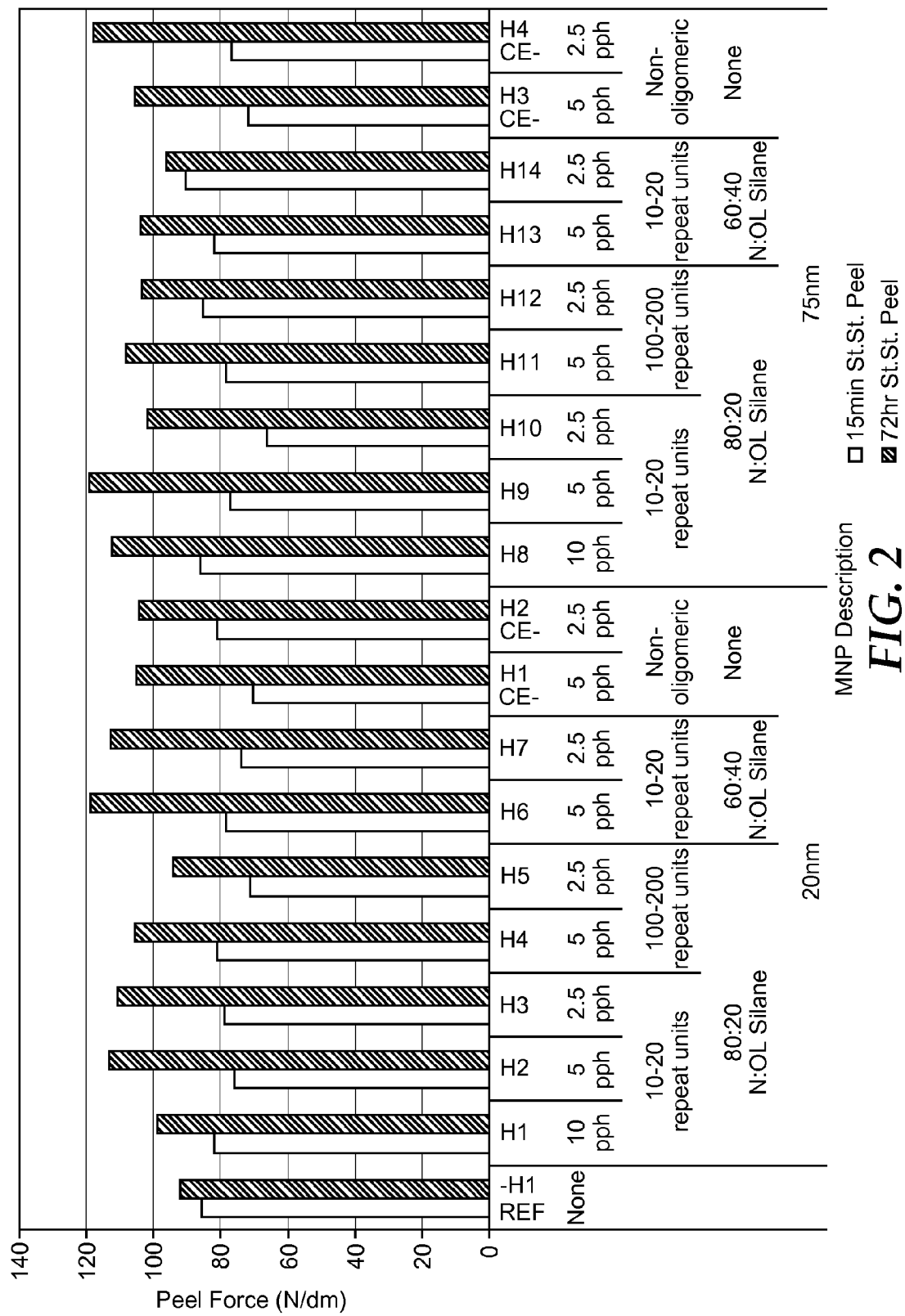
FIG. 2 is bar chart showing the peel performance of the adhesives of Data Set H against polypropylene, a low surface energy substrate.

The cured pressure-sensitive adhesives were evaluated for Shear Time at 70° C. on stainless steel using a 1000 g weight. 15 Minute and 72 Hour Peel Adhesion Strength on a high surface energy substrate (i.e., stainless steel) and a low surface energy substrate (i.e., polypropylene) were measured as described in the test methods above. The results are shown in Table 12 and summarized in FIGS. 1 and 2.

TABLE 12

Composition and results for Data Set H.

| | | MNP | | | Shear (+) | Peel (N/dm) | | | |
|---|---|---|---|---|---|---|---|---|---|
| | | | | | | StS | | PP | |
| EX | I.D. | pph | NP:P (*) | MW (g/mol) | StS (min) | 15 min | 72 Hr | 15 min | 72 Hr |
| REF-H1 | — | 0 | — | — | 10000+ | 86 | 92 | 22 | 27 |
| H1 | MNP-2 | 10 | 80:20 | 5000 | 10000+ | 82 | 99 | 30 | 51 |
| H2 | MNP-2 | 5 | 80:20 | 5000 | 10000+ | 76 | 113 | 29 | 44 |
| H3 | MNP-2 | 2.5 | 80:20 | 5000 | 10000+ | 79 | 111 | 24 | 39 |
| H4 | MNP-4 | 5 | 80:20 | 30,000 | 10000+ | 81 | 106 | 25 | 36 |
| H5 | MNP-4 | 2.5 | 80:20 | 30,000 | 10000+ | 71 | 94 | 23 | 37 |
| H6 | MNP-3 | 5 | 60:40 | 5000 | 10000+ | 79 | 119 | 30 | 50 |
| H7 | MNP-3 | 2.5 | 60:40 | 5000 | 10000+ | 74 | 113 | 27 | 43 |
| CE-H1 | MNP-1 | 5 | 100:0 | — | 10000+ | 70 | 105 | 20 | 27 |
| CE-H2 | MNP-1 | 2.5 | 100:0 | — | 10000+ | 81 | 104 | 21 | 29 |
| H8 | MNP-11 | 10 | 80:20 | 5000 | 10000+ | 86 | 112 | 23 | 34 |
| H9 | MNP-11 | 5 | 80:20 | 5000 | 10000+ | 77 | 119 | 24 | 36 |
| H10 | MNP-11 | 2.5 | 80:20 | 5000 | 10000+ | 66 | 102 | 23 | 35 |
| H11 | MNP-13 | 5 | 80:20 | 30,000 | 10000+ | 79 | 108 | 25 | 34 |
| H12 | MNP-13 | 2.5 | 80:20 | 30,000 | 10000+ | 85 | 103 | 27 | 34 |
| H13 | MNP-12 | 5 | 60:40 | 5000 | 10000+ | 82 | 104 | 29 | 44 |
| H14 | MNP-12 | 2.5 | 60:40 | 5000 | 10000+ | 90 | 96 | 26 | 40 |
| CE-H3 | MNP-5 | 5 | 100:0 | — | 10000+ | 72 | 106 | 26 | 30 |
| CE-H4 | MNP-5 | 2.5 | 100:0 | — | 10000+ | 77 | 118 | 26 | 28 |

Various modifications and alterations of this invention will become apparent to those skilled in the art without departing from the scope and spirit of this invention.

What is claimed is:

1. A pressure sensitive adhesive comprising an acrylate polymer and surface-modified nanoparticles, wherein the surface-modified nanoparticles comprise
   (a) a nanoparticle comprising a silica surface;
   (b) a polymeric silane surface modifying group; and
   (c) a non-polymeric silane surface modifying group;
wherein the polymeric silane surface modifying group and the non-polymeric silane surface modifying group are covalently bonded to the silica surface of the nanoparticle, and wherein the polymeric silane surface modifying group comprises repeat units derived from (meth)acrylate monomers.

2. The pressure sensitive adhesive of claim 1, wherein the acrylate polymer comprises the reaction product of one or more (meth)acrylate monomers and at least one vinyl carboxylic acid monomer, wherein the (meth)acrylate monomers include a first (meth)acrylate monomer wherein an alkyl group of the first (meth)acrylate monomer contains 4 to 18 carbon atoms, inclusive.

3. The pressure sensitive adhesive of claim 2, wherein the vinyl carboxylic acid monomer is selected from the group consisting of acrylic acid and methacrylic acid.

4. The pressure sensitive adhesive according to claim 2, wherein the acrylate polymer comprises 2 to 10 percent by weight of repeat units derived from the vinyl carboxylic acid monomers based on the total weight of repeat units derived from the vinyl carboxylic acid monomers and the (meth)acrylate monomers in the acrylate polymer.

5. The pressure sensitive adhesive according to claim 2, wherein the acrylate polymer comprises 0.5 to 1.5 percent by weight of repeat units derived from the vinyl carboxylic acid monomers based on the total weight of repeat units derived from the vinyl carboxylic acid monomers and the (meth)acrylate monomers in the acrylate polymer.

6. The pressure sensitive adhesive according to claim 1, wherein the polymeric silane surface modifying group further comprises repeat units derived from vinyl carboxylic acid monomers.

7. The pressure sensitive adhesive according to claim 1, wherein the polymeric silane surface modifying group comprises at least 10 repeat units.

8. The pressure sensitive adhesive according to claim 1, wherein the polymeric silane surface modifying group comprises no greater than 200 repeat units.

9. The pressure sensitive adhesive according to claim 1, wherein the non-polymeric silane surface modifying group comprises at least one of a trialkoxy alkyl silane and a trialkoxy aryl silane.

10. The pressure sensitive adhesive according to claim 1, wherein the mole percent ratio of the non-polymeric surface modifying group to the polymeric surface modifying group is between 95:5 and 50:50, inclusive.

11. The pressure sensitive adhesive according to claim 10, wherein the mole percent ratio of the non-polymeric surface modifying group to the polymeric surface modifying group is between 80:20 and 60:40, inclusive.

12. The pressure sensitive adhesive according to claim 1, wherein the polymeric surface modifying group comprises a functional group capable of crosslinking with the acrylate polymer.

13. The pressure sensitive adhesive of claim 12, wherein the functional group comprises a hydrogen-extracting group.

14. The pressure sensitive adhesive of claim 13, wherein the hydrogen-extracting group comprises benzophenone.

15. The pressure sensitive adhesive according to claim 1, further comprising a crosslinker.

16. The pressure sensitive adhesive according to claim 1, comprising between 5 and 20 parts by weight, inclusive, of the surface modified nanoparticles per 100 parts by weight of the acrylate polymer.

17. The pressure sensitive adhesive according to claim 1, further comprising a tackifier.

\* \* \* \* \*